United States Patent
Blackstock

[15] 3,698,659
[45] Oct. 17, 1972

[54] FERRY SYSTEM

[72] Inventor: Thomas A. Blackstock, Poquoson, Va.

[73] Assignee: The United States of America as represented by the Administrator of the National Aeronautics and Space Administration

[22] Filed: Aug. 24, 1970

[21] Appl. No.: 66,206

[52] U.S. Cl. ........................................... 244/1 SS
[51] Int. Cl. ........................................... B64c 37/00
[58] Field of Search ................... 244/1 R, 1 SS, 1 SD

[56] References Cited

UNITED STATES PATENTS 3,140,847  7/1964  Ames .......................... 244/1 R
3,160,366  12/1964  Graffenried .............. 244/1 SS Primary Examiner—Edward A. Sroka
Attorney—Wallace J. Nelson, Howard J. Osborn and John R. Manning

[57] ABSTRACT

This invention relates to an auxiliary lift system to provide a means of transportation for large lifting entry vehicles.

2 Claims, 2 Drawing Figures

PATENTED OCT 17 1972 3,698,659

INVENTOR
THOMAS A. BLACKSTOCK

BY Howard J. Osborn
Wallace J. Nelson
ATTORNEYS

FERRY SYSTEM

ORIGIN OF THE INVENTION

The invention was made by an employee of the National Aeroantuics and Space Administration and may be manufactured and used by or for the Government of the United States without the payment of any royalties thereon or therefor.

This invention relates to an auxiliary lift system and relates in particular to a ferry package to provide a feasible means of transportation for large entry vehicles and the like.

Emphasis on the development of low cost shuttle vehicles for future manned space programs has stimulated broad interest in reusable systems. Current designs lean strongly toward runway landing and aircraft-type operational characteristics including the use of power for landing and the provision for go-around. Extending the time of powered flight also provides a ferrying capability; however, the trade-off between launch weight and cruise time mitigates strongly against carrying into space more fuel than is necessary to provide satisfactory landing. Also, the size of various entry vehicles proposed for "space shuttle" type applications precludes the use of conventional systems for transporting the vehicles from the manufacturing factory to launch site, from landing site to the factory for refurbishment, or any point-to-point movement within the confines of the earth's atmosphere. It is also impractical to disassemble the vehicle for transportation. Although these proposed space shuttle-type vehicles are adequately maneuverable during high-speed reentry to permit flying thereof to a selected landing site, the lift/drag ratio of the vehicles and the limited amount of fuel that can be carried thereby make it impractical to attempt earth takeoffs and landings.

Accordingly, it is an object of the present invention to provide a novel apparatus to serve as a transportation assist for large lifting entry vehicles and the like.

Another object of the present invention is a novel auxiliary lift system for a basic flight vehicle.

A further object of the present invention is a detachable system for substantially doubling the lift/drag ratio of a basic flight vehicle.

Another object of the present invention is removable apparatus for extending the powered flight capability of lifting entry vehicles to permit ferrying thereof from point-to-point within the confines of the earth's atmosphere.

According to the present invention, the foregoing and other objects are attainable by providing a "bolt-on" ferry package for an entry vehicle including a body member adapted to be received by and connected to the entry vehicle. A pair of swept wings extend from the body member with at least one propulsion engine being attached to each wing. Fuel tanks for the propulsion engines are formed within the wings and body member.

A more complete appreciation of the invention and many of the attendant advantages thereof will be readily apparent as the same becomes better understood by reference to the following detailed description when considered in connection with the accompanying drawings wherein.

Figure 1:
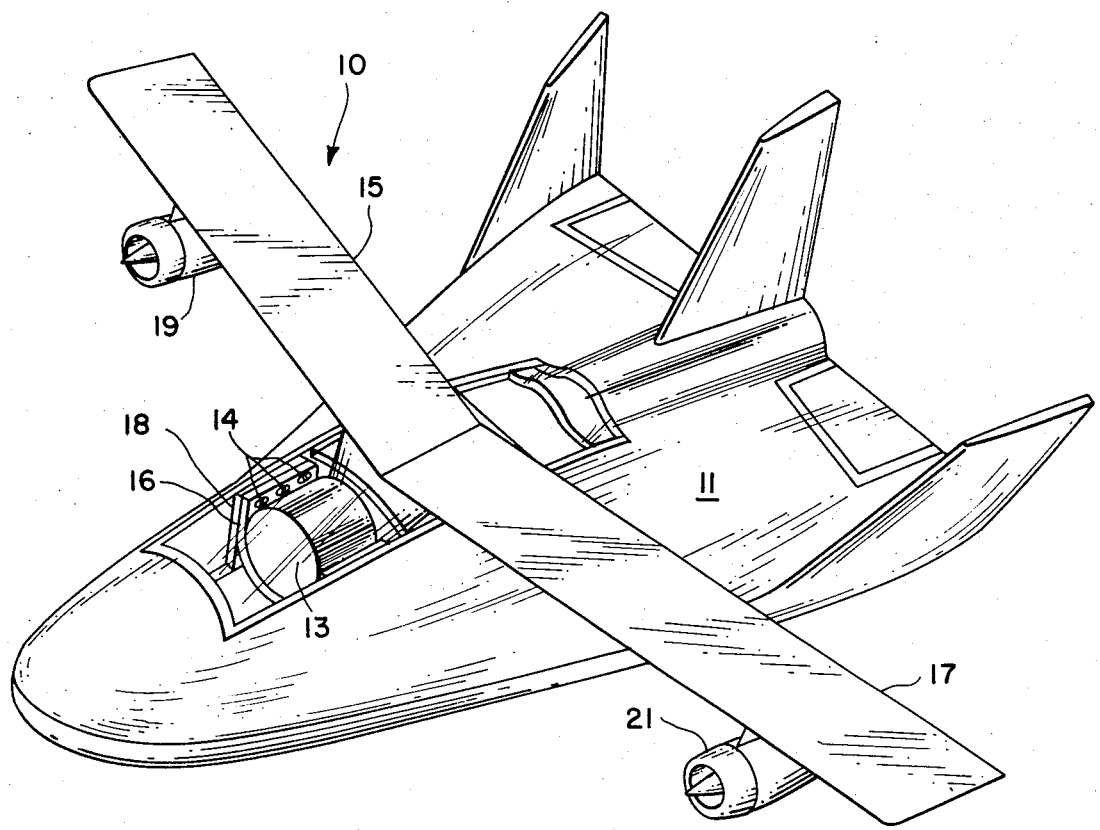
FIG. 1 is a perspective view of the ferry system of the present invention when attached to one type of entry vehicle.
Figure 2:
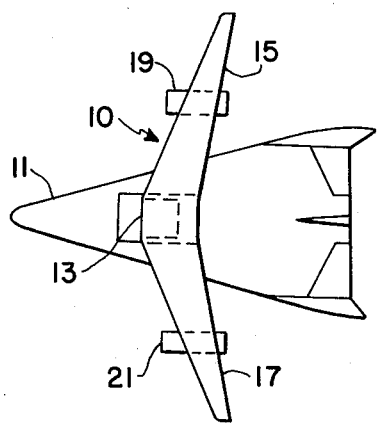
FIG. 2 is a top plan view of the ferry system and vehicle shown in FIG. 1.

Referring now to the drawings and more particularly to FIG. 1, there is shown the ferry system of the present invention, and generally designated by reference numeral 10, attached to entry vehicle 11. Ferry system 10 includes a fuel tank and body member 13, a pair of swept wings 15 and 17 integral with and extending from body member 13, and a pair of propulsion engines 19 and 21 attached to respective wings 15 and 17. Body member 13 is adapted to fit the payload or cargo space within vehicle 11 and serves the dual purpose of a fuel tank for engines 19 and 21 and as the attachment connection between ferry system 10 and vehicle 11. Ferry system 10 may be attached to vehicle 11 by a plurality of bolts 14 which extend through an integral bracket 16 into the cargo attachment fitting 18. Any suitable and conventional bolts, expandable sections or the like that is applicable for retaining the normal payload in vehicle 11 may serve to connect body member 13 to vehicle 11. The specific details of the bolts or other connection mechanism employed will vary depending upon the type vehicle employed with ferry system 10 and is not described or shown in further detail here in the interest of clarity, it being understood that any suitable and conventional attachment between body member 13 and vehicle 11 is applicable to the present invention.

Thus, ferry system 10 may be installed to vehicle 11 by removing the normal payload and payload hatch doors from vehicle 11 and bolting the ferry system to the cargo attachment fitting 18. The only other required connections are electrical connections for engine operation.

Ferry system 10 is described and shown herein when in use with NASA's HL–10 lifting entry vehicle 11. The cargo bay of this vehicle is approximately 30 feet long and 15 feet in diameter with a design weight of 25,000 pounds for return cargo capability from an earth orbital flight. It is estimated that the lift-off weight of an entry vehicle increases more than 6 tons per minute of powered subsonic flight planned for the entry vehicle. The approximate dry weight of ferry system 10 designed for the HL–10 entry vehicle shown is 31,000 pounds. To incorporate such a system in the orbital payload would result in prohibitive increases in lift-off weight since providing onboard fuel alone for a modest 300-mile cruise increases the lift-off weight by half million pounds. However, by employing the ferry system 10 ranges of over 1,000 miles at sea level are readily obtainable and the ferry system provides adequate economical transportation for vehicle 11 from site of manufacture to launch or from landing site to refurbishment location.

The configuration shown and described has been tested and proved longitudinally stable at all positive angles of attack and neutrally stable at $\alpha=0$. The stability level can be increased by a slight rearward movement of the wing or by further sweeping. The swept wing configuration shown is laterally and directionally stable throughout the test range. Aerodynamic characteristics of ferry configurations with straight and swept wings of aspect ratios of ten have been obtained from tests at a Mach number of 0.3 and Reynolds numbers up to $15 \times 10^6$ based on body strength. A maximum trimmed lift/drag ratio approaching nine or more than that of basic vehicle 11 was obtained at an angle of attack of 10° and a lift coefficient of 0.6. The quarter-chord of the straight untapered wing is set at 52 percent of the body length.

It is thus seen that the present invention provides a savings in launch vehicle system weight as compared to a system in which the engines, wings and fuel are incorporated as an integral part of the lifting entry vehicle. As an example, in a space shuttle system with a cargo requirement of 50,000 pounds, the ferry package including fuel would weight at least 100,000 pounds. Including this as an integral part of the lifting entry vehicle could easily triple the total launch weight of the system, an increase in this case of several million pounds. Another advantage of the present invention is that it can be designed solely for subsonic performance whereas a system integral with the vehicle would be required to encompass thermal protection as well as possess suitable aerodynamic characteristics throughout the speed range involved from launch through entry. Various control parameters provided by movable surfaces of the basic vehicle 11 have been tested and it was shown that for the wing position shown in the Figures little more than 5° of elevon deflection is necessary for trim over the angle of attack range anticipated. The aileron and rudder control parameters are very similar to those of the basic vehicle 11 whose control effectiveness has been adequately demonstrated in flight tests.

The normal controls employed in vehicle 11 during entry would also be used when ferry system 10 is attached thereto. In the embodiment tested two turbofan engines that provided an engine thrust of 45,000 pounds were employed.

Although the invention has been described relative to a specific embodiment thereof, it is not so limited and obvious variations and modifications will be apparent to those skilled in the art without departing from the spirit or scope of the appended claims. Thus, the inventive concept could be applied to transport any cargo whose inherent aerodynamic characteristics permit the installation of a "bolt-on" ferry package. In some cases a tail assembly would also have to be attached. This cargo could include large tanks or bus-type vehicles which could be adapted to air transportation by the addition of the ferry package. Also the ferry system of the present invention is readily adaptable to any vehicle presently being considered in the space shuttle studies. Any additional fixtures needed in the cargo bay of the various vehicles to permit connection thereof to the ferry system of the present invention would have negligible effect on the initial gross weight of the vehicles.

What is claimed as new and desired to be secured by Letters Patent of the United States is:

1. An auxiliary lift system for a lifting entry vehicle to serve as a transportation aid for the vehicle at subsonic flight comprising in combination:
    a lifting entry vehicle having a compartment therein for a payload,
    a ferry package for said lifting vehicle and integrally attached to the payload compartment of said vehicle,
    said ferry package including:
    a fuel tank
    said fuel tank being adapted to be received by the payload compartment in said lifting vehicle,
    means within said payload compartment and connection means formed on said fuel tank serving to readily permit connection and disconnection of said ferry package to said vehicle,
    a pair of wings integral with and extending from said fuel tank
    at least one propulsion engine suspended from each of said wings, and
    wherein said ferry package may be removed as a unit from said vehicle after serving as a transportation aid therefor and reused as a unit as a transportation aid for the same or another vehicle.

2. A method of substantially doubling the lift/drag ratio of a basic vehicle to provide subsonic flying capability to a vehicle that due to its lift/drag ratio and limited fuel capacity render the vehicle impractical for conventional earth takeoff and landings, comprising the steps of (1) providing a basic flight vehicle that is adapted to be launched into a space mission by a rocket propulsion system and after the space mission is completed, adapted to reenter the earth's atmosphere and be flown by its occupants to a selected landing site; (2) providing a "bolt-on" ferry package that is readily connectible to the basic flight vehicle at its landing site, said ferry package including (a) a body member including a fuel tank adapted to be received by and connected to the basic vehicle, (b) a pair of swept wings extending from the body member and (c) at least one propulsion engine attached to each wing, (3) connecting the "bolt-on" ferry package to the basic vehicle to thereby improve the subsonic flight characteristics of the basic vehicle and permit earth takeoff and landing thereof, and (4) removing the ferry package after transportation of the basic vehicle to its destination and wherein the ferry package may be subsequently reused as so desired to assist in transporting the same or another basic vehicle.

* * * * *